Figure 1:
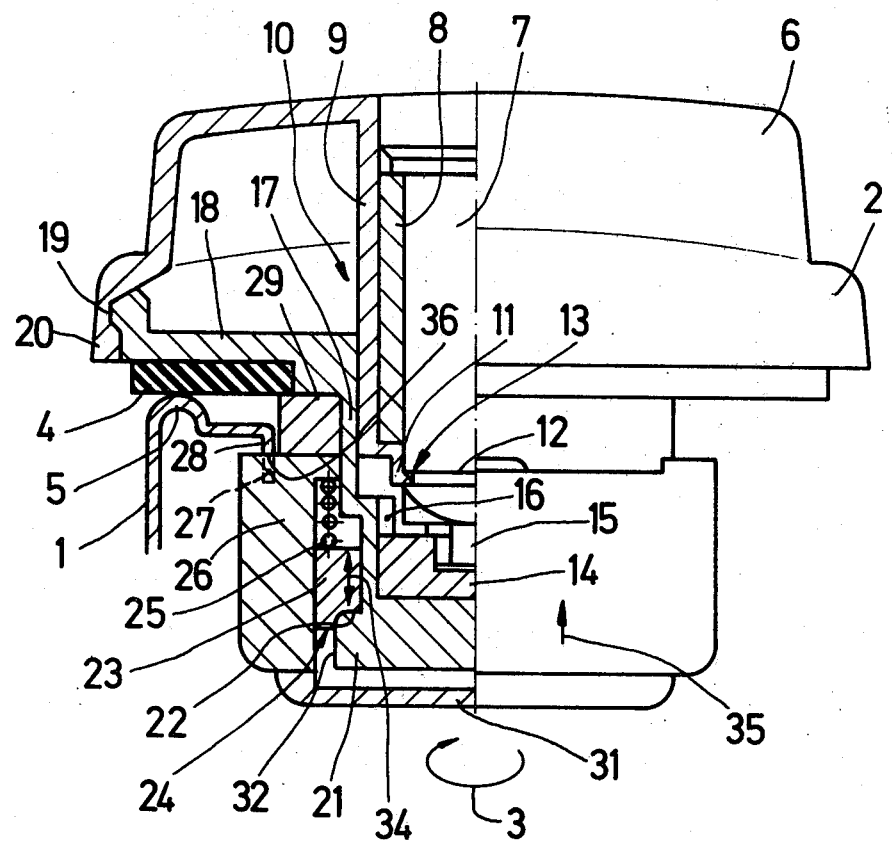

United States Patent [19]

Reutter

[11] 4,436,219
[45] Mar. 13, 1984

[54] SEALING CAP FOR A GASOLINE TANK

[75] Inventor: Heinrich Reutter, Waiblingen, Fed. Rep. of Germany

[73] Assignee: Reutter Metallwarenfabrik GmbH, Waiblingen, Fed. Rep. of Germany

[21] Appl. No.: 444,205

[22] Filed: Nov. 24, 1982

[30] Foreign Application Priority Data

Nov. 26, 1981 [DE] Fed. Rep. of Germany ....... 3146824

[51] Int. Cl.³ ...................... B65D 41/96; B65D 41/36
[52] U.S. Cl. ............................. 220/295; 220/DIG. 33
[58] Field of Search ............... 220/293, 295, 301, 302, 220/303, DIG. 32, DIG. 33

[56] References Cited

U.S. PATENT DOCUMENTS 4,339,055 7/1982 Hutzenlaub ........................ 220/295
4,376,492 3/1983 Bartel et al. ........................ 220/293

Primary Examiner—George T. Hall
Attorney, Agent, or Firm—Toren, McGeady and Stanger

[57] ABSTRACT

In order to place a sealing cap, which is to be placed in particular on a filler neck of a gasoline tank, on the neck so as to preserve the seal with little actuation force but so that it seals securely, the sealing cap is equipped with a turning lifting apparatus (24, 43) which effects a pressing of the sealing ring (4) at the free neck end (5) when the turning stop (26) of the sealing cap encounters the counter stop (27) of the filler neck (1). A pressing member (23) is displaced in the axial direction against the resistence of a compression spring (25) in the turning stop (26) via the turning lifting apparatus and simultaneously moves a radial outer collar which is coupled with the turning handle (2) in the displacement direction and which is contacted by the sealing ring (4) against the free neck end (5), whereby the sealing ring is pressed together. By means of an indicator window (54) one can read off the fully closed position of the sealing cap with certainty. An interior pressure which is too high or a vacuum can be prevented by means of pressure and vacuum relief valves.

22 Claims, 10 Drawing Figures

SEALING CAP FOR A GASOLINE TANK

The invention is directed to a sealing cap with a turning stop for placing on a filler neck, particularly of a gasoline tank, provided with a counter stop, which sealing cap is supported on the free end of the filler neck with the intermediary of a sealing ring, wherein the turning stop engages under a neck edge facing the interior of the neck. Such sealing caps are known, in particular, in connection with gasoline tanks of motor vehicles. They are placed on the filler necks and are constructed in such a way that they sealingly rest on the free neck end on the one hand and, on the other hand, project into the filler neck and, in so doing, engage a neck edge facing into the nect interior. A sealing ring is clamped in between a suitable support surface of the sealing cap and the free front end of the filler neck. The counter stop of the filler neck is normally formed by means of two tabs projecting into the interior of the neck, completely located in the latter and offset by 180° and a sliding edge is connected prior to these tabs. The turning stop of the sealing cap is moved away over this sliding edge leading to a tensioning of a spring of the turning stop which is effective in the axial direction of the filler neck and must be supported accordingly so as to be movable in the sealing cap. The spring tensioning finally effects the pressing of the sealing cap against the filler neck and the pressing together of the sealing ring accordingly. The springing support of the turning stop, which is preferably constructed as a web, U-shaped stirrup, or the like, traversing the sealing cap naturally also has as a result that with a sufficiently great interior pressure in the tank, or the like, the sealinng cap can be somewhat lifted from the filler neck against the resistence of the turning stop and this leads under circumstances to the discharge of gasoline in the case of a gasoline tank.

Accordingly, the object of the invention consists in developing a sealing cap of the type named above in such a way that a springing-elastic lifting from the filler neck during inadmissable pressure at the inside of the sealing cap is prevented or at least made more difficult and the tight sealing of the filler neck is nevertheless guaranteed by means of the sealing cap.

In order to meet this object is is suggested, according to the invention, that the sealing cap be constructed in accordance with the main concept of claim 1 and according to the characterizing part of this claim. This sealing cap will, as usual, be placed on the filler neck and subsequently turned approximately 90° until its turning stop comes to rest on the counter stop of the filler neck. This turning proceeds relatively easily because the axial distance of the turning stop from the sealing ring is selected as a fixed measure in such a way that the seal rests only loosely at the filler neck, at least at the beginning of the turning. By means of a special construction, it can even be achieved that the sealing ring remains axially unloaded during the entire turning movement until the turning stop encounters the counter stop and the sealing pressing is first effected when the turning lifting apparatus draws the axially displaceable part of the sealing cap against the free neck end. Accordingly, a part of the elements of the sealing cap can be turned by a greater amount than the parts which are non-rotatably connected with the turning stop, for which parts the turning movement ends, as mentioned, when the turning stop encounters the counter stop. The continued turning movement then makes possible, through a suitable mechanism of the turning lifting apparatus, a change of the turning movement into the axial feed movement of the parts of the sealing cap coupled with the sealing ring in the displacing direction. The turning protection member can possibly secure those parts which should not participate in said turning movement from the beginning on. Since the sealing cap is employed as a rule with a standardized neck whose clear cross-section is not circular at the filler neck, a form-locking securing of the turning protection member at the free neck end and can be achieved through corresponding shaping.

The slide piece, which simultaneously forms a turning carrier for the turning stop, at first only carries out its function as turning carrier during the first phase of the turning movement when the sealing cap is closed; and it does this only until the turning stop has encountered the counter stop. Subsequently, it acts as a pure slide piece, i.e., it slides along a counter surface or counter edge, wherein, according to the principle of the oblique plane, the axial contact pressure movement for the sealing ring is produced via this sliding of the one part on the other. It is of secondary importance in this regard which of the two relatively turned parts has the wedge surface, or the like, since, to that extent, it concerns only kinematic reversals.

A particularly preferred embodiment form of the invention is characterized in accordance with claim 2. The term "wedge surface" is to be understood here in the broadest sense, i.e., the surface need not necessarily extend continuously and, when it extends continuously, its inclination can be thoroughly different over the length of the sliding distance. Basically, as mentioned, it is only a matter of the principle of the oblique plane in the broadest sense with which a turning movement can be changed into a lifting movement. Accordingly, the slide piece can have a particularly inclined slide surface as well as a slide edge. Moreover, seen over the circumference, more than one such sliding turning lifting apparatus of the same type can be provided.

A further development of the invention results from the characterizing part of claim 3. The support of the pressing member in the interior of the turning stop, of course, concerns a sliding bearing. Indeed, both are coupled with one another in the turning direction so that a relative movement is excluded to this extent.

A further development of the invention is described in the characterizing part of claim 4. On the basis of the non-circular cross-section of the pressing member and, accordingly, naturally also on the basis of the receiver in the turning stop for the pressing member, the above-mentioned carrying in the turning direction and axial displacing ability is achieved.

Another variation of the invention is characterized in claim 5. In so far as a circulating border or edge is employed in place of one or, for example, two radially projecting shoulders, then at least one cam or wedge surface, respectively, is located on this border. An advisable further development provides that, as seen in the sliding direction, a stop for the slide piece is connected at least one wedge surface. "Sliding direction" corresponds to the turning direction at any time when the cap is closed. Accordingly, the stop mentioned above terminates the continuing turning movement of those parts of the sealing cap which could still continue to turn around a pregiven angle after the turning stop encounters the counter stop.

Another important embodiment form of the invention consists in that a catch recess is directly introduced in front of the stop or each stop, respectively, and the slide piece has a catch, in each instance, at its slide surface, which catch cooperates with it, or the slide piece is constructed as a catch. Each catch, together with its catch recess, effects a protection against faulty turning of the fully turned, sealingly arranged sealing cap. Moreover, it tells the user that the turning end-position has been reached. However, in order to relieve the sealing ring as little as possible, the catch recess is not especially sharply defined.

Another construction of the invention consists in that a rear (with respect to the sliding direction) edge of each stop or of the slide piece, respectively, cooperates with a reverse turning stop of the pressing member. After the disengagement of the turning lifting apparatus all the turnable parts of the sealing cap are turned back together into the starting position in which the sealing cap can be pulled out of the non-circular filler neck opening. The reverse turning stop can be placed in such a way that the rotational carrying is effected until the turning stop encounters the counter stop without, or without any substantial most motion distance when the sealing cap is replaced subsequently.

Moreover, it is especially advantageous that a compression spring, preferably a screw compression spring, be arranged between the pressing member and the inner surface of the pot bottom of the turning stop, which compression spring effects the return movement of all parts of the turning lifting apparatus after cessation of the force being applied thereupon. Moreover, this compression spring forms a transmission member for the contact pressure force with which the inwardly projecting neck border is pressed in to a certain extent between the assigned front edge of the turning stop and the sealing ring.

Another embodiment of the invention follows from claim 10. The sealing cap top with the turning toggle, or the like, formed on it can be identical or similar to already known sealing caps with respect to shape. In the latter, aside from a bead type turning toggle, the star-shape and similar shaping facilitating turning has since become known.

An advisable further development of the invention is described in claim 11. Should the closing cylinder not be employed, one can couple the two parts of the neck-shaped shoulder in a manner other than via a closing cylinder and bolt as well. Accordingly, this sealing cap is suitable as a sealable and an unsealable embodiment.

In an advisable embodiment form, the annularly formed turning protection member is employed between the turning stop and the radial outer collar of the lower shoulder piece. In this embodiment form the turning protection member serves as a kind of bearing ring for the remaining parts of the sealing cap during the first turning phase until the turning stop encounters the counter stop, which, in turn, is nevertheless supported in a form-locking manner and, accordingly, non-rotatably supported in the neck. Another very important object of this turning stop consists in that it forms a distance ring which holds the sealing ring and the turning stop at an axial distance relative to one another such that the seal can slide over the free neck end in the unpressed state during the first phase of the turning movement.

Another variation of the invention consists in that the radial outer collar of the lower shoulder piece is connected so as to catch with the free border of the upper shoulder piece or of the turning handle, respectively. It is possible hereby to produce as well as assemble these parts at low cost. Moreover, a turning guide is also produced in this manner.

Another construction of the invention provides that the closing cylinder is connected so as to catch with the free end of the tubular upper shoulder part with the intermediary of a reinforcing sleeve. The reinforcing sleeve can be composed of, e.g., fiber glass reinforced plastics material distinguished by a high strength. On the other hand, a simpler and, accordingly, less expensive material can be employed for all the rest of the turning handle so that one can still achieve a saving despite the two-piece construction. At the inner end of the closing cylinder is located a circulating groove in which springing, barblike catching members catch, which catching members form a collar or ring. The reinforcing sleeve is secured against rotation by means of a form-locking engagement in the tubular upper shoulder part. Either a non-circular outer contour or radially projecting retaining shoulders, or the like, are employed.

Another preferred embodiment form of the invention is characterized through claim 15. The outer contour of the turning protection member is non-circular and it preferably corresponds to the light cross-section of the filler neck at the filler end. As already mentioned, the turning protection member also forms a distance element which holds the supporting surface of the turning stop at the correct distance from the sealing ring and accordingly from the neck edge of the preferably standardized neck as well, which neck edge faces toward the interior of the neck.

A groove can be cut into the transition area of the outer collar into the annular part of the turning protection member in which groove the inner border of the sealing ring engages so that it is secured by the groove so as to be substantially undetachable.

A further development of the invention follows from the characterizing part of claim 16. The step type recess permits a catching relative twisting of the assigned slide piece. In the "lowest" catch the above mentioned parts only form a carrier device for the turning stop. As soon as the latter encounters the counter stop of the filler neck, a relative movement of each slide piece relative to its front edge takes place. Only then does the pressing of the sealing ring begin. On the other hand, however, the sealing ring remains stationary relative to the filler neck during the entire rotation, so that it is subjected to no wear whatsoever. During the tensioning of the turning lifting apparatus it is only pressed axially against the filler neck. The pressing of the sealing ring increases until the slide piece arrives at the turning stop. Actually, the individual steps already act as a turning stops, however, each slide piece can catch one step further if the turning moment is too high. The progressive ratios are naturally dispensed with when a continuously ascending edge is employed in place of the step-shaped edge. However, the step-shaped edge is given preference because it guarantees in any case that the pressing of the sealing ring only begins when the turning stop reaches the counter stop. As seen from the untwisting direction, standardized filler necks, particularly of gasoline tanks in motor vehicles, have a slide edge in front of the counter stop. However, the dimensionings of the above-described sealing cap are chosen in such a way that the turning stop does not touch the slide edge at all; rather a form-locking engagement occurs as soon as the turning stop encounters the neck counter stop. Thus, this sealing cap can be placed without any expenditure of force and can be turned until the turning stop has already occupied the correct turning end position. Only then does a comparatively small expenditure of force take place with which the pressing of the sealing ring is carried out. This sealing cap therefore not only guarantees a simple assembly, but also a high degree of air-tightness and a tilt-free placement.

Another variation of the invention is characterized in that, in order to form the turning lifting apparatus, the turning stop has at least one slide surface which (or each of which, respectively) cooperates with a cam type turning carrier non-rotatably connected with the turning handle in a springing, axial pressing, or vice versa. The latter is understood to mean that the slide surface can also be located at the turning carrier. This sealing cap is distinguished by a particularly simple and compact constructional form. This is especially true when the turning stop is manufactured, in an advisable way, in one piece with an axially acting compression spring constructed as a wave-shaped ring spring, wherein at least one of the waves simultaneously forms a slide surface and acts as a carrier catch. With respect to the turning carrying, the entire carrier catch is utilized, whereas, with respect to the sliding, only the front half of the wave (as seen from the sliding direction) is required. The waves need not necessarily be of equal size and shape in the circumferential direction, but it is advantageous if the wave height is the same all around in order to guarantee a good support along the entire circumference.

As another construction of the invention it is suggested that the turning stop be formed by means of two radially projecting tabs of the ring spring which are offset by 180° and that a slide surface be located in the area of each tab. In the closing position of the cap, that is, when the sealing ring is pressed together, a turning carrier lies in the area of each tab, which turning carrier effects a reduction of the lever arm and thus a bending reinforcement which secures, or at least supports, the necessary pressing pressure for the sealing ring. The other construction of the invention follows from the characterizing part of claim 20.

An especially advantageous construction of all the embodiment forms consists in that the turning handle has a least one indicator window, or the like, and a rotatable sealing cap part arranged behind it or under it, respectively, and defined relative to it carries at least one indicator symbol which is located in the area of the indicator window when the sealing cap is entirely closed and tightly pressed on the neck. The symbol can be, e.g., the word "CLOSED". In a preferred manner, however, to indicator windows, or the like, offset by 180° are provided in order to guarantee a good "reading" when the sealing cap is placed on the neck in a position which is offset be a half rotation. Because of this construction one always knows without a doubt when the sealing cap is located in the fully closed position in which a maximum air-tightness is guaranteed. Should the symbol or symbols, respectively, not be visible, then the parts which are rotatable relative to one another are located in an intermediate position in which the sealing cap can neither be removed nor tightly seals the filler neck. Accordingly, with these sealing caps, it can not occur, in contrast to the previously known prior art, that the neck is mistakenly thought to be completely sealed and, in the case of a motor vehicle, gasoline is lost en route because of the insufficiently closed neck. It is advisable that the symbols be arranged on the abovementioned radial outer collar or the pressing plate, respectively, on whose opposite side the sealing ring is supported. In other instances, the symbols should be non-rotatable relative to this pressing plate or the radial outer collar, respectively.

Figure 2:
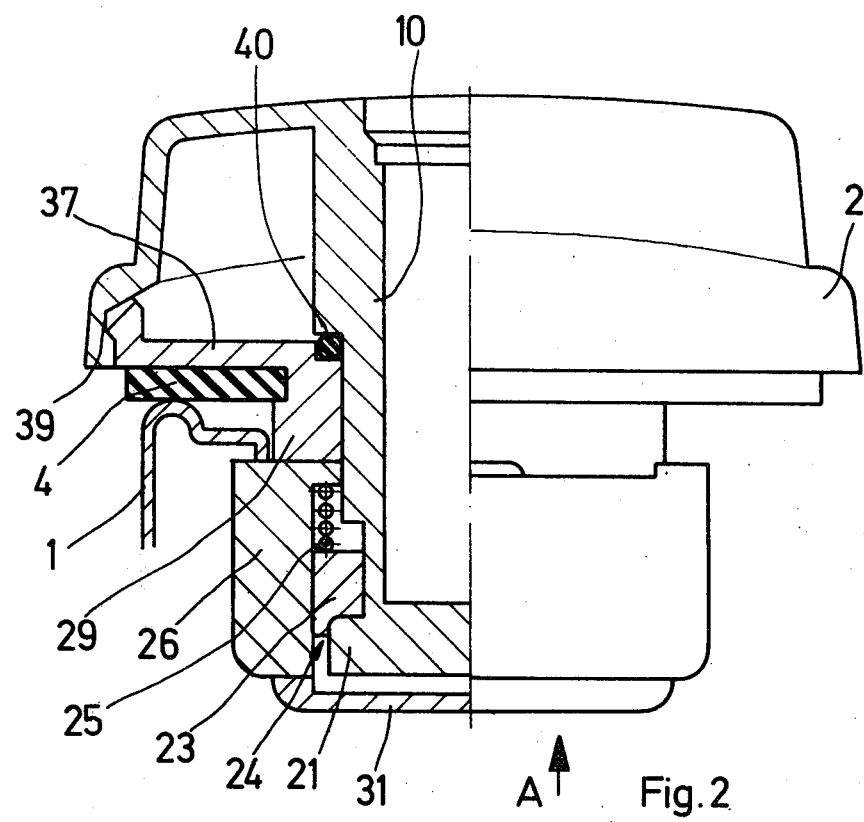
Figure 3:
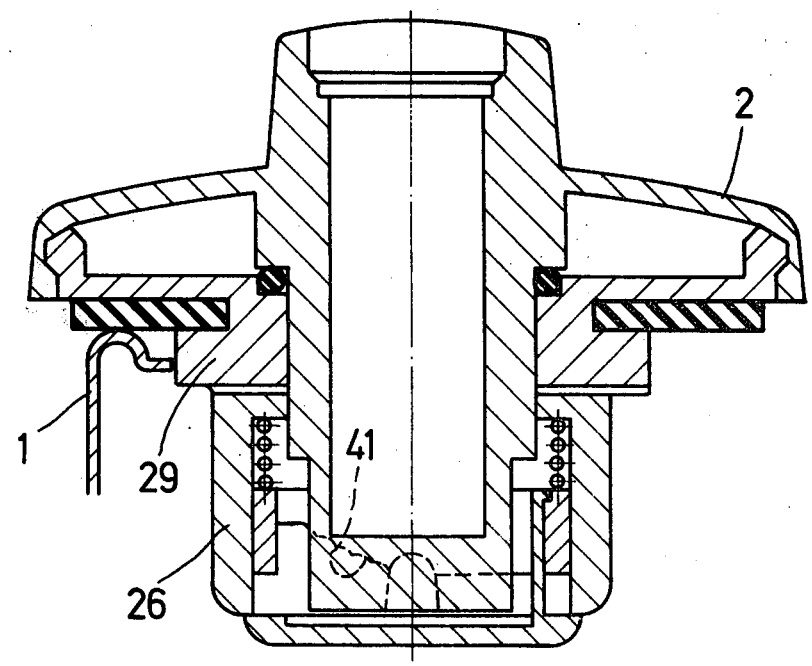
Figure 4:
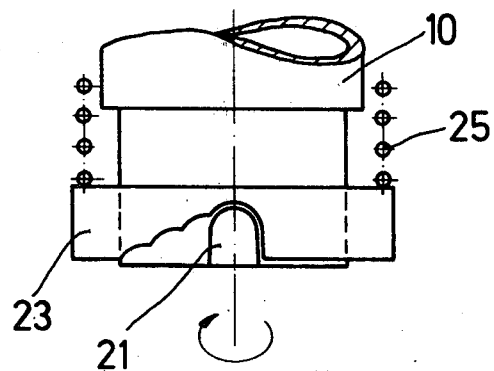
Figure 5:
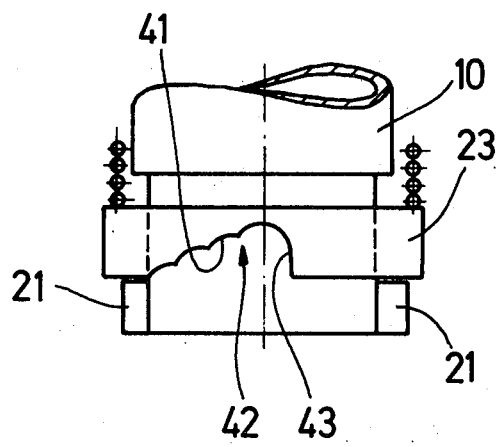
Figure 6:
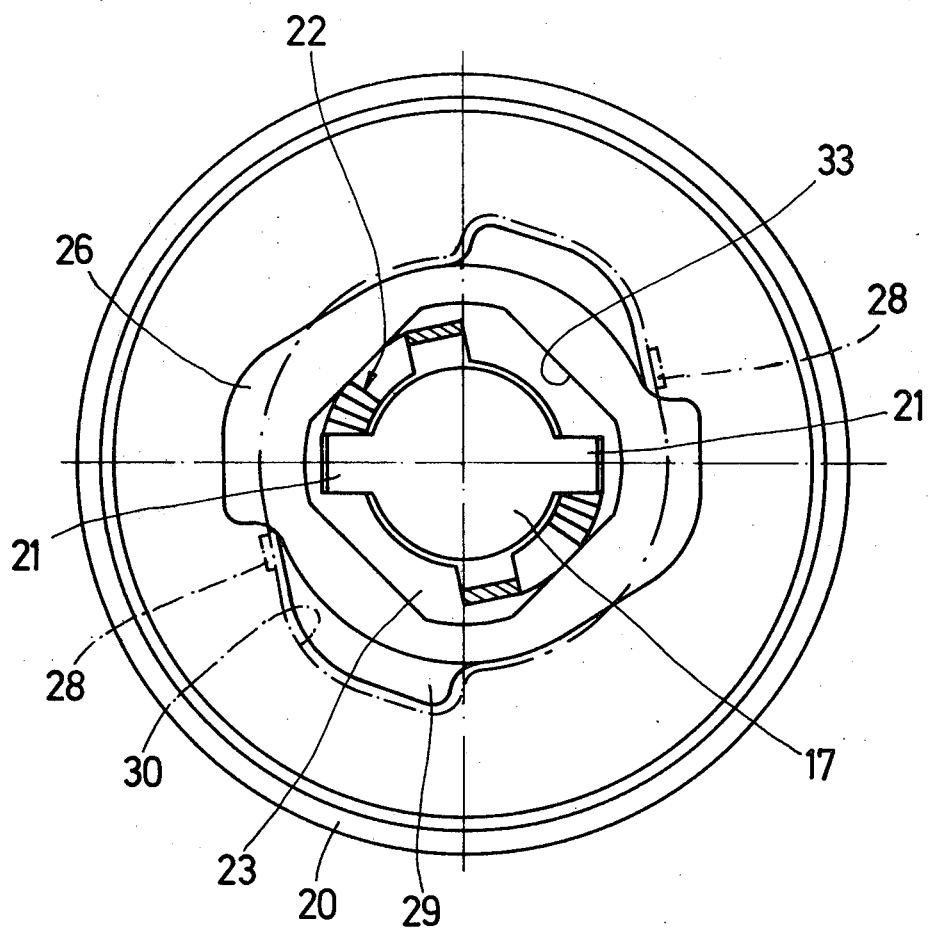
Figure 7:
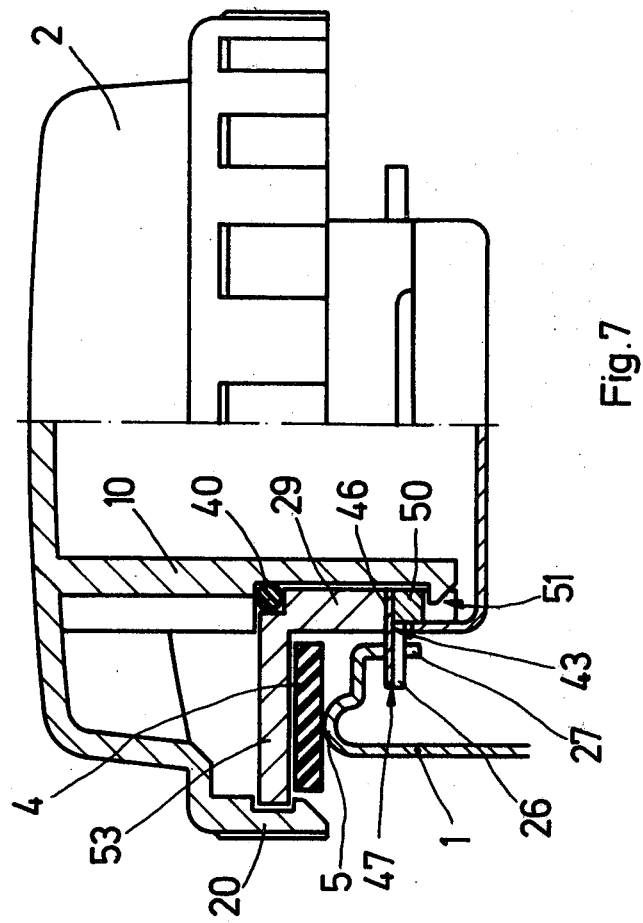
Figure 8:
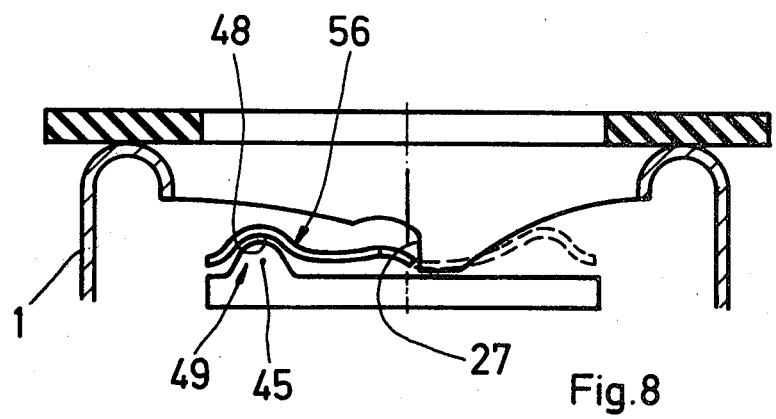
Figure 9:
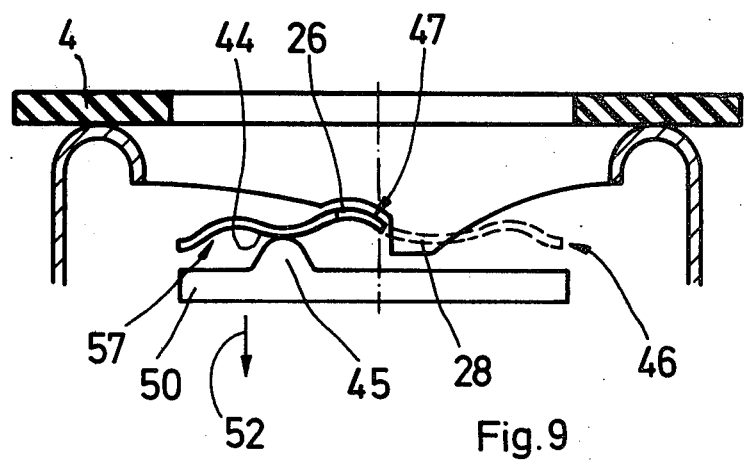

Various embodiment examples of the invention are shown in the drawing. Shown are:

FIG. 1 a half section through a first embodiment form,

FIG. 2 a half section through a second variant,

FIG. 3 a full section through the sealing cap of FIG. 2, but in a position rotated by 90°, FIG. 4 a detail from FIG. 3, in the front view in the assembly position, FIG. 5 a comparable representation in the sealed position, FIG. 6 a view of FIG. 2 in arrow direction A with removed cover of the free turning stop end, FIG. 7 another half section of a third embodiment example, FIGS. 8 and 9 two details from FIG. 7, specifically, one in the assembly position and the other in the sealed position.

Figure 10:
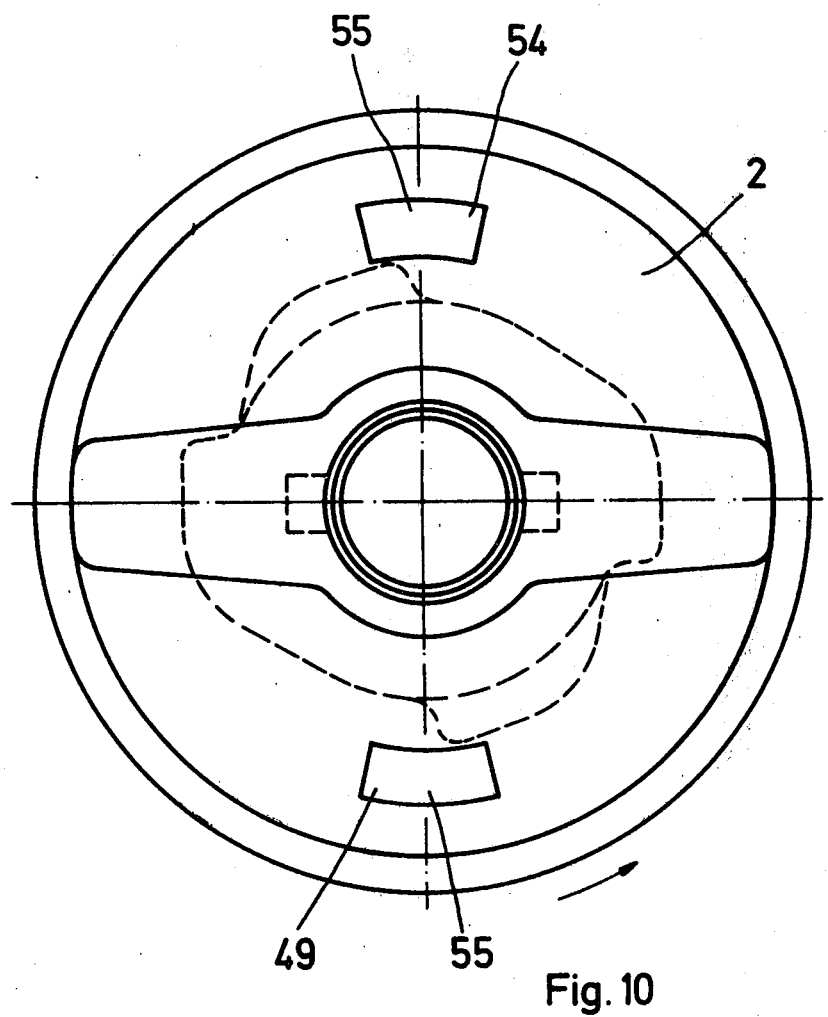

FIG. 10 a top view of the sealing cap.

The filler neck is placed on the filter neck 1, particularly of a gasoline tank of a motor vehicle, or the like, and brought into its closing position by means of turning it turning handle 2, for example, in the direction of arrow 3, in which closing position the sealing ring 4 is firmly pressed on the free neck end 5, whereby the neck is tightly sealed. The turning handle 2 can be of a known shape and can have a central turning toggle 6 formed like a bead. FIG. 1 shows a sealable version with a centrally installed closing cylinder 7. It is non-rotatably supported in a reinforcing sleeve 8 which, in turn, is arranged so as to be non-rotatable in the upper shoulder part 9 of a neck-shaped shoulder 10 of the handle 2. At its inner end, the upper shoulder part 9 carries a ring of catch noses 11 which are caught in an outer groove 12 at the inner end of the closing cylinder 7 while forming a snap connection 13. A peg 15 of the inner closing cylinder end, which peg 15 extends in the axial direction and is eccentrically arranged, engages in a correspondingly constructed groove of a bolt 14 which is displaceable in a radial direction. This bolt cooperates with a turning stop 16 of the lower shoulder part 17 of the neck-shaped shoulder 10. In the radially outwardly displaced position of the bolt 14 shown in the drawing the lower shoulder part 17 is thus non-rotatably coupled with the upper shoulder part 9. The closing cylinder is then located in the OPEN position. However, should the closing cylinder be located in its closed position, then the bolt 14 is drawn back from the peg 15 of the closing cylinder 10 by the turning stop 16 thereby uncoupling the lower shoulder part 17 from the upper part 9. If the handle 2 is turned in this closing position, then the lower shoulder part 17 and the parts which are non-rotatably connected with it do not participate in this turning movement and the sealing cap therefore remains in its closing position.

At its upper end and the lower shoulder part 17 carries a radial outer collar 18 which forms a pressing plate for the sealing ring 4. A catching or snapping connection 19 with the free border 20 of the turning handle 2 guarantees a reinforcement during the pressing of the sealing ring 4 on the one hand and, on the other hand, guarantees an outer support during an idle spinning of the handle 2 in the closed position of the closing cylinder 7. The above-mentioned radial guide for the bolt 14 is worked into the lower end of the shoulder part 17. Moreover, two radially projecting slide pieces 21 are formed on there. They work together with a wedge surface 22, or the like, of an annular pressing member 23, wherein these two latter form a turning lifting apparatus 24. The pressing member 23 is supported at an inner collar of a turning stop 26 by means of a compression spring 25 preferably constructed as a screw compression spring. The turning stop 26 cooperates with a counter stop 27 of the filler neck 1. The counter stop is formed by two inwardly projecting tabs 28 of the standardized filler neck 1, which tabs 28 are offset by 180°. A turning protection member 29 is arranged between the turning stop 26 and the radial outer collar 18 of the lower shoulder part 17. The turning protection member 29 is annular with a central borehole but its outer circumference is adapted to the non-circular light cross-section 30 (following FIG. 6) in the area of the tabs 28 so that a form-locking engagement results. A cover cap 31, welded on or affixed by means of ultrasonics, tightly seals the inner opening of the turning stop 26.

The wedge surface 26 can extend continuously or can be stepped or steplike in accordance with the drawing in FIG. 6. From this drawing one also sees that the cross-sectional shapes of the turning stop 26 and the turning protection member 29 are the same. When the sealing cap is placed on the filler neck 1 both coincide. The lock is thus opened. If one now turns the turning step 26 relative to the turning protection member 29 with the help of the handle 2 of the bolt 14 of the lower shoulder part 17 as well as of the pressing member 23, then the position of parts 26 and 29 which can be seen in FIG. 6 is finally achieved, wherein the two radially projecting, cam type shoulders of the turning stop 26 strike the counter stop 27, i.e., the front edge of the tab 28 in question which faces forward. The carrying of the pressing member 23 is effected by means of the turning lifting apparatus 24 which is simultaneously a turning carrying apparatus because the slide pieces 21 also form turning carriers 32. The carrying is made possible because of the wedge surfaces 22. On the outside, the pressing member 23 is non-circular and borehole 33 has the same cross-section (FIG. 6) so that a form-locking engagement results. A square cross-section with rounded corners is preferred. The pressing member 23 is displaceable in this borehole 33 in the direction of the double arrow 34 as well as in a direction against the resistence of the compression spring 26.

When the turning stop 26 has encountered the counter stop 27 and the turning moment still persists at the turning handle 5, i.e., the user continues to turn the turning handle in the same turning direction, a relative rotation of the slide piece 21 relative to its assigned wedge surface 22 is effected and this leads to a displacement of the pressing member 23 in the direction of arrow 35 against the resistance of the compression spring 25. But since the turning stop 26 engages under a neck edge 36 facing into the interior of the neck and, accordingly, cannot diverge in the direction of arrow 35, the lower shoulder part 17 with all the parts non-displaceably coupled with it must compulsorily move against the arrow 35 into the neck interior. This leads to a pressing of the sealing ring 4 on the free neck end 5. A self-locking prevents an undesirable returning movement. If the closing cylinder 7 is now brought into the closed position, one can neither eliminate the sealing pressing nor draw back the lower shoulder part 17 and the parts non-rotatably connected with it. A turning stop (not shown) terminates the relative turning of the slide piece 21 relative to the circular surface 22 of the pressing member 23. The same thing can be achieved by means of the blocking position of the compression spring 25.

The embodiment form according to FIGS. 2 and 3 is very similar to that in FIG. 1, for which reason only the different construction will be described in the following.

The neck-shaped shoulder 10 of the turning handle 2 is no longer two-piece, but one-piece. Here, the turning protection member 29 carries a radially projecting outer collar 37 for it, which is connected with the outer border of the handle 2 via a snapping connection in the same way as the corresponding parts of the snapping catch connection 19. A radial sealing ring, in particular, an O-ring 40, which engages in a channel of the protection member 29, is arranged between the turning protection member 29 and a relief of the neck-shaped shoulder 10.

The wedge surface 22 of the pressing member 23 can, as already mentioned, extend continuously or discontinuously and can be constructed as a step-shaped, front edge 41 (see FIGS. 4 and 5), wherein a recess 42 at the lower border of the pressing member 23 is involved there. In this way, one of the turning stops, or, more precisely, the turning stop 43 for the slide piece 21, originates in the inner end of this recess; specifically, this is the stop for rotating back out of the fully closed position of the sealing cap.

When this sealing cap is placed on the filler neck 1, then the turning protection member 29, in connection with the above-mentioned form-locking engagement with the light cross-section 30 according to FIG. 6, prevents a turning of the sealing ring 4 also during the first phase of the turning movement until the turning stop 26 encounters the counter stop 27 of the filler neck 1. This first applies for the subsequent tensioning of the sealing ring via the turning lifting apparatus 24.

In the embodiment example of FIGS. 7 to 9, the turning stop has two slide surfaces 44 which are offset by 180° and each of which forms a turning lifting apparatus 56 with a cam type turning carrier 45 connected with the turning handle 2 during springing, axial pressing. The turning stop 26 is manufactured in one piece with, or constructed as, respectively, an axially acting compression spring constructed as a wave-shaped ring spring 46, wherein at least one of the waves simultaneously forms a slide surface 44 and acts as a carrier catch 57. Naturally, with two turning carriers, two such carrier catches and slide surfaces are present. Accordingly, it is actually only the two radially projecting tabs 47 of the ring spring 46, which tabs 47 are offset by 180°, which act as a turning stop. Since the carrier catches 57 for the cam type turning carrier 45 are located in each instance in the area of a tab 47, this embodiment example effects a strong reinforcement of the counter stop 27 in the closed position because of the reduction of its effective spring length. In FIGS. 8 and 9 the relations in the opened and closed sealing cap are somewhat exaggeratedly represented. The waves of the corrugated spring, as seen over the circumference, are preferably equally high, but a somewhat narrower wave is provided in the area of each tab 47, which narrower wave guarantees a good catching with the turning carrier 45 in the closed closing position.

When the turning carrier 45 engages in the wave 48 of the wave-shaped ring spring 46 in the starting position of the loose sealing cap, then a turning carrier apparatus 49 originates in this manner. Since the turning carrier 45 is located at a ring piece 50, which is coupled with the neck-shaped shoulder 10 of the turning handle 2 via a catch connection 51 and is shown in a somewhat simplified manner in FIGS. 8 and 9, a turning of the handle 2 effects not only a carrying of the ring piece 50, but also of the wave-shaped ring spring 46 until the turning stop 26 encounters the counter stop 27 of the filler neck 1. A continued turning in the same turning direction leads to an overrunning of the slide surface 44 by the turning carrier 45. In so doing the ring piece 50 carries out a downward movement in the direction of arrow 52. The ring piece 50 carries the turning handle 2 in the same direction via the catch connection 51 and the sealing ring 4 is pressed against the free neck end 5 because of the form-locking connection of the outer collar 53 of the turning protection member 29 with the border 20 of the handle 2. The turning movement of the ring piece 50 must be stopped by means of a suitable turning stop (not shown).

According to FIG. 10, the turning handle 2 has at least one, but preferably two, indicator windows 54, or the like, offset by 180°, through which an indicator symbol 55, e.g., the word CLOSED, can be seen at least when the sealing cap is fully closed. In this manner it is guaranteed that one only stops turning in the closing direction when the sealing cap has also actually reached the turning end position. Since, when opening, the part (e.g., 18, 37, 53) carrying the indicator symbol 55 can be turned further with the turning handle after the sealing is loosened, it is not provided to provide a second indicator symbol offset in the turning direction, because this would be visible already after the first partial turning and would continue to remain visible during the second part of the reverse turning movement. This could lead to a misinterpretation of this indicator.

Since this sealing cap closes especially tightly, it is suggested in another embodiment of the invention that it at least be provided with a pressure relief valve. Thus, if the pressure in the filler neck increases above the pick-up or safety or pressure of this pressure relief valve, then the latter will open and thereby provide for a decrease of pressure. In addition, one can also install a vacuum valve which decreases a vacuum which may possibly arise in the interior of the tank when it is empty.

I claim:

1. Sealing cap with turning stop (26) for placing on a filler neck (1) provided with a counter stop (27), in particular of a gasoline tank, which is supported with the intermediary of a sealing ring (4) on the free end (5) of said filler neck, wherein said turning stop engages under a neck edge (36) facing into the neck interior, characterized in that a turning handle (2) carries a slide surface (21) which simultaneously forms a turning carrier (32) for said turning step (26), wherein said turning carrier and said turning stop are coupled via a turning lifting apparatus (24, 43) and in that a turning protection member (29) rotatably supported at said turning handle is rotatably supported in said neck (1).

2. Sealing cap according to claim 1, characterized in that a spring-loaded pressing member (23) is displaceably but non-rotatably supported in the longitudinal direction of said neck (1) at said turning stop (26) in order to form said turning lifting apparatus (24), said pressing member (23) having at least one wedge surface (22), or the like, extending in the circumferential direction, which wedge surface (22) cooperates with one or more slide surfaces or edges of said slide piece (21), or vice versa, wherein a turning stop of said pressing member (23) in each instance defines the turning movement of said slide piece (21) in both turning directions.

3. Sealing cap according to claim 2, characterized in that said turning stop (26) has the shape of a pot-shaped hollow body whose pot border faces into the neck interior and whose pot bottom outer surface engages under said neck edge (36) facing into said neck interior, wherein shoulders of the pot outer wall, which shoulders are offset by 180° and are formed on, in particular, form stop elements; and in that said turning handle (2) centrally penetrates the pot base with a step-shaped shoulder (10) and said pressing member (23) is supported in the interior of said turning stop (26).

4. Sealing cap according to claim 3, characterized in that said pressing member (23) has a non-circular outer contour, constructed in particular approximately as a square with rounded corners, as well as a substantially annular form and said neck-shaped shoulder (10) of said turning handle (2) of said pressing member (23) penetrates in the axial direction, wherein said slide piece (21) is located at the inner shoulder end.

5. Sealing cap according to claim 4, characterized in that said slide piece (21) is constructed as a radially projecting border or shoulder, particularly composed of two shoulders offset by 180°, which, together with said wedge surface (22) in each instance, form said turning lifting apparatus (24) at the end of said pressing member (23), which end faces into said neck interior.

6. Sealing cap according to claim 5, characterized in that a stop for said slide piece (21) is connected at at least one said wedge surface.

7. Sealing cap according to claim 6, characterized in that a catch recess is directly arranged in front of the stop or stops and said slide piece (21) has a catch or catches at its slide surface, which catch cooperates with it, or said slide piece (21) is constructed as a catch.

8. Sealing cap according to claim 6 or 7, characterized in that a rear edge (as seen from the sliding direction) of each stop or of said slide piece (21), respectively, cooperates with a reverse turning stop of said pressing member (23).

9. Sealing cap according to at least one of claims 3 to 8, characterized in that a compression spring (25), preferably a screw compression spring, is arranged between said pressing member (23) and the pot bottom inner surface of said turning stop (26).

10. Sealing cap according to at least one of claims 3 to 9, characterized in that said turning handle (2) is constructed as a sealing cap outer top, particularly with a turning toggle (6), or the like, formed on it, which can be nonrotatably coupled with said neck-shaped shoulder (10) or connected, particularly manufactured in one piece.

11. Sealing cap according to claim 10, characterized in that said neck-shaped shoulder (10) is constructed in two pieces and the upper shoulder part (9) receives a closing cylinder (7), whereas a radially displaceable bolt (14) is supported in the lower part (17), which bolt (14) is coupled with at least one said turning stop (16) of said lower shoulder part (17) in the closing position; and in that a receptacle or at least a contact surface for said sealing ring (4) is located at a radial outer collar (18) of said lower shoulder part (17) and said pressing member (23) as well as said turning stop (26) are supported on it so as to be displaceable in the axial direction.

12. Sealing cap according to claim 11, characterized in that said annularly constructed turning protection member (29) is inserted between said turning stop (26) and said radial outer collar (18) of said lower shoulder part (17).

13. Sealing cap according to claim 11 or 12, characterized in that said radial outer collar (18) of said lower shoulder part (17) is connected so as to catch with the free end of said upper shoulder part (9) or of said turning handle (2), respectively.

14. Sealing cap according to at least one of claims 11 to 13, characterized in that said closing cylinder (7) is connected so as to catch with the free end of said tubular upper shoulder part (9) with the intermediary of a reinforcing sleeve (8).

15. Sealing cap according to claim 10, characterized in that said turning protection member (29) has a substantially annular form and a radially projecting outer collar (37), particularly formed on to it, is connected with said turning handle (2) so as to be rotatable and, in particular, so as to catch (39) and forms a support member for said sealing ring (4), wherein said turning handle (2) is supported in said turning projection member (29) so as to be rotatable and sealed (40).

16. Sealing cap according to claim 15, characterized in that said neck-shaped shoulder (10) of said turning handle (2) carries, particularly on its free end, two radially projecting turning carriers (21) offset by 180°, which simultaneously form slide pieces and cooperate in each instance with a step-shaped, front edge (41), preferably with a recess of said pressing member (23), wherein one of said turning stops (43) for said slide piece (2) is located at the inner end of said recess.

17. Sealing cap according to claim 1, characterized in that said turning stop (26) has at least one said slide surface (44) for forming said turning lifting apparatus (43), which slide surface (44) cooperates with one or more, respectively, cam type turning carriers (45) non-rotatably connected with said turning handle (2) in springing axial pressing, or vice versa.

18. Sealing cap according to claim 17, characterized in that said turning stop (26) is constructed in one piece with an axially acting compression spring constructed as a wave-shaped ring spring (46), wherein at least one of the waves, in each instance, simultaneously forms a slide surface (44) and acts as a carrier catch (48).

19. Sealing cap according to claim 18, characterized in that said turning stop (26) is formed by means of two radially projecting tabs (47) of said ring spring (46), which tabs are offset by 180°, and a slide surface (44) is located in the area of each tab.

20. Sealing cap according to claim 18 or 19, characterized in that said turning carriers (45) are located at a ring piece (15) of said neck-shaped shoulder (10) of said turning handle (2), which ring piece (15) is coupled in particular so as to catch, and said ring spring (46) is supported on the one side at said ring piece and, on the other side, at a sleeve forming said turning protection member (29), which sleeve is rotatable and arranged so as to be sealed at said neck-shaped shoulder, the radially outwardly projecting border (53) of said sleeve forming a pressing plate for said sealing ring (4).

21. Sealing cap according to at least one of the previous claims, characterized in that said turning handle (2) has at least one indicator window (49), or the like, and a sealing cap part (18, 37, 53) arranged behind or beneath it, respectively, which sealing part is rotatable and defined relative to said indicator window (49) and carries at least one indicator symbol (45) which is located in the area of said indicator window when said sealing cap is fully closed and pressed tightly at said neck (1).

22. Sealing cap according to at least one of the previous claims, characterized through at least one pressure relief valve or vacuum relief valve, respectively, which opens in said filler neck (1) during excess pressure and/or at under pressure or vacuum.

* * * * *